United States Patent
Lee

(10) Patent No.: US 7,593,063 B1
(45) Date of Patent: Sep. 22, 2009

(54) METHOD OF DETECTING A FORMAT TYPE OF AN INCOMING VIDEO SIGNAL AND SOURCE FORMAT DETECTOR THEREOF

(75) Inventor: Yuan-Chung Lee, Tai-Nan (TW)

(73) Assignee: MediaTek Inc., Hsin-Chu Hsien (TW)

( * ) Notice: Subject to any disclaimer, the term of this patent is extended or adjusted under 35 U.S.C. 154(b) by 853 days.

(21) Appl. No.: 11/306,860

(22) Filed: Jan. 13, 2006

(51) Int. Cl.
*H04N 5/46* (2006.01)
(52) U.S. Cl. .................. 348/558; 348/555
(58) Field of Classification Search ........... 348/558, 348/449, 554, 555; *H04N 5/46, 3/27*
See application file for complete search history.

(56) References Cited

U.S. PATENT DOCUMENTS 6,842,194 B1 * 1/2005 Sugihara .............. 348/558
7,430,017 B2 * 9/2008 Lee ..................... 348/558

* cited by examiner

*Primary Examiner*—Sherrie Hsia
(74) *Attorney, Agent, or Firm*—Winston Hsu

(57) ABSTRACT

A source format detector for detecting a format of a video signal includes a frequency data generator for generating first frequency data corresponding to a first field in the video signal, and second frequency data corresponding to a second field in the video signal; a transform domain comparator for comparing the first frequency data with the second frequency data to thereby obtain a comparison result; and a detector for detecting the format of the video signal according to comparison results for a plurality of first and second fields.

30 Claims, 8 Drawing Sheets

METHOD OF DETECTING A FORMAT TYPE OF AN INCOMING VIDEO SIGNAL AND SOURCE FORMAT DETECTOR THEREOF

BACKGROUND

The invention relates to processing video signals, more particularly, to detecting a source format of an incoming video signal.

It is often desired to display a movie originally recorded on film by means of a television broadcast. In order to comply with television broadcast field rates, some sort of film-to-video conversion must be performed. Typically, a movie is recorded and displayed at a frame rate of 24 frames per second. However, television broadcasts use a different rate, such as the 59.94 fields per second rate (i.e., 30 interlaced frames per second) of the NTSC standard where every two fields are interlaced and comprise one frame.

One method of converting film frame rates to television field rates is referred to as the "3:2 pull down" scanning method. A first film frame is scanned twice to make two fields, and then a second film frame is scanned three times to make three fields, the next frame twice, etc. To accommodate the fact that the NTSC vertical scan period is slightly less than 60 fields per second, the actual display rate may be slowed slightly.

FIG. 1 illustrates a segment of movie film being scanned for broadcast as an NTSC television signal. As indicated, the film displays 24 frames per second. Frame 1 has been scanned three times to make three fields of the television signal. Frame 2 has been scanned two times, Frame 3 three times, etc. The result is a television signal having 60 fields per second, which approximates the 59.94 field per second rate of the standard NTSC format. This process is referred to as "3:2 pull down scanning".

Although the above description is in terms of 3:2 pull down scanning to an NTSC television signal, the same concepts apply to scanning movie films to other television formats. For example, for a PAL broadcast of 50 fields per second, a film-to-video ratio of 2 television fields per movie frame might be used. For this reason, the 3:2 pull down scan format is generally referred to as a "film-to-video format", characterized by the fact that source image frames are scanned in a periodic sequence that results in a desired frame-to-field ratio. In the above example, the desired ratio is: (60/24)=(5/2). For integer frame numbers, this is equivalent to five fields for every two frames, with the best symmetry being accomplished with 3:2 pull down scanning.

At the receiving end of the television broadcast, when the television receiver includes digital processing components, a recent development has been the conversion of the incoming television signal into digital data for further processing. For example, some sort of motion compensation processing with video compression can be performed to prevent the viewer from perceiving visual artifacts as a result of motion in the scene being displayed. Additionally, film to video conversion with motion compensation is now being combined with techniques for digitizing the video data. These techniques include digital compression techniques requiring less bandwidth (bits per second) during transmission. Motion in the scene that was originally filmed is indicated if there is a change between adjacent fields. Those fields that represent the same movie frame will have no motion. However, at every boundary where a different movie frame has been scanned, the scene may change and there can be motion. Although various processing techniques have been developed for compensating the effects of motion between television fields, these methods are not generally designed for film-to-video formats.

One compression technique is embodied in a standard known as "MPEG", named for the Moving Picture Experts Group that began the effort to provide a standard. The MPEG standard attempts to strike a balance between the high compression associated with interframe coding and the random access capability associated with intraframe coding. To answer this challenge, the MPEG standard uses two interframe coding techniques, predictive and interpolative, and an intra coded technique. For coding video data, the MPEG encoding techniques are used to encode MPEG "pictures" from fields or frames of video data.

However, the best processing choices for the particular video digitizing method depend on the format of the digitized television signal. In other words, the same processing algorithm might not be the best algorithm for data that represents film format as would be used for standard NTSC data. It is therefore necessary to detect when an incoming signal has a film format so that appropriate motion compensation processing can be performed.

In other application, de-interlacing is a video post-processing technique to provide progressive video output for progressive TV, such as LCD TV or Plasma TV. It is also necessary to detect when an incoming signal has a film format so that an appropriate interpolation method can be performed for the de-interlacing process. This detection and interpolation process is called inverse Telecine. Each frame of the progressive video output is generated by combining two fields originally from the same film frame. The output rate of the inverse Telecine processing is 60 frames per second for NTSC signal or 50 frames per second for PAL signal.

SUMMARY OF THE INVENTION

One objective is therefore to provide a method of detecting a format type of an incoming video signal, to solve the above-mentioned problem by allowing selection of an appropriate digitizing method or interpolation method.

According to an exemplary embodiment, a method of detecting a format of a video signal comprises generating first frequency data corresponding to a first field in the video signal; generating second frequency data corresponding to a second field in the video signal; comparing the first frequency data with the second frequency data to obtain a comparison result; and detecting the format of the video signal according to comparison results for a plurality of first and second fields.

According to another exemplary embodiment, a source format detector for detecting a format of a video signal comprises a frequency data generator for generating first frequency data corresponding to a first field in the video signal, and second frequency data corresponding to a second field in the video signal; a transform domain comparator for comparing the first frequency data with the second frequency data to thereby obtain a comparison result; and a detector for detecting the format of the video signal according to comparison results for a plurality of first and second fields.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
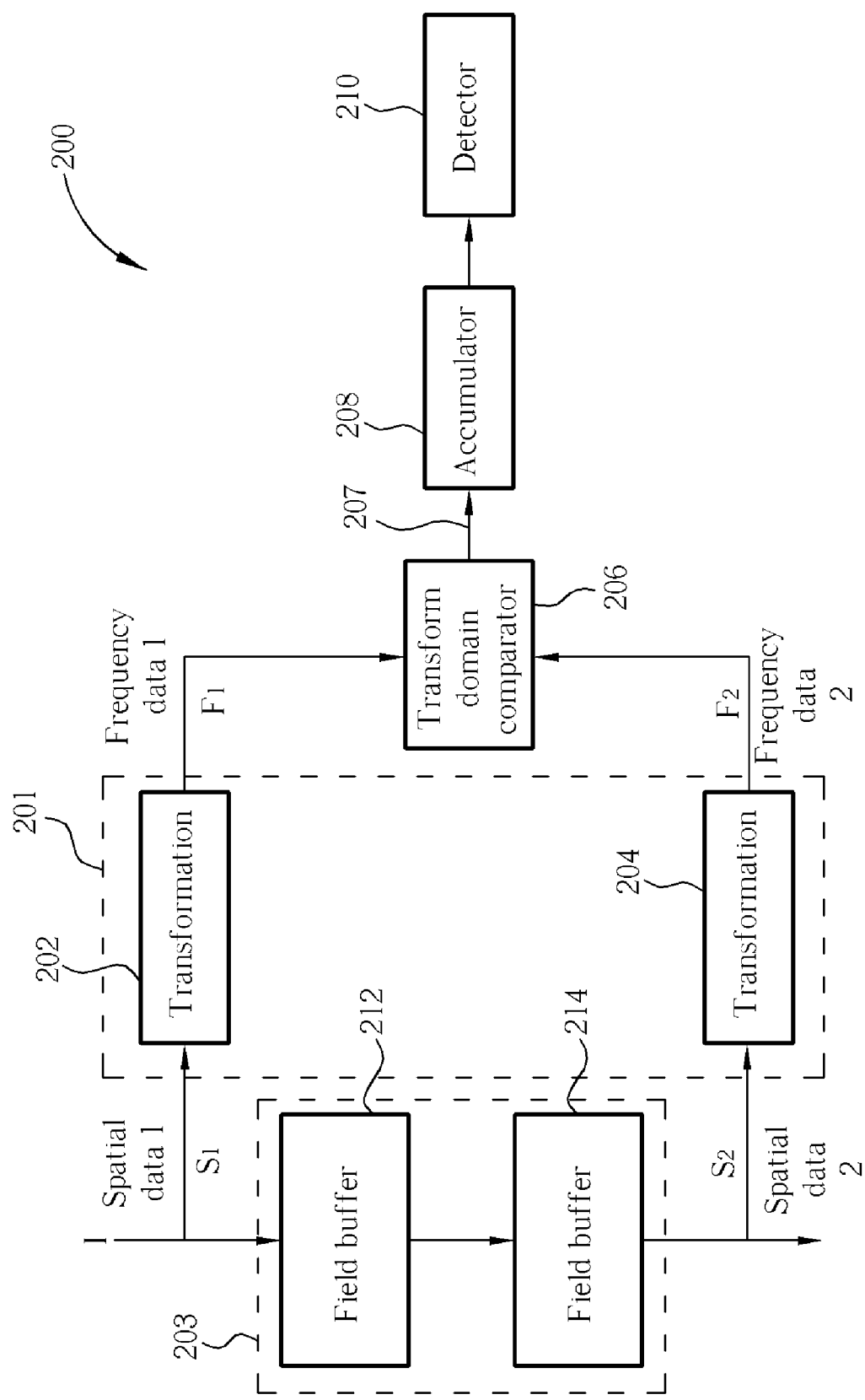
FIG. 2 is a block diagram of a first source format detector for detecting a format type of an incoming video signal according to a first exemplary embodiment.

FIG. 2 shows a block diagram of a first source format detector 200 for detecting a format type of an incoming video signal I according to a first exemplary embodiment. In this embodiment, the source format detector 200 includes a memory unit 203, a frequency data generator 201, a transform domain comparator 206, an accumulator 208, and a detector 210. As shown in FIG. 2, the memory unit 203 further includes a first field buffer 212 and a second field buffer 214, and the frequency data generator 201 further includes a first transformation unit 202 and a second transformation unit 204.

Figure 1:
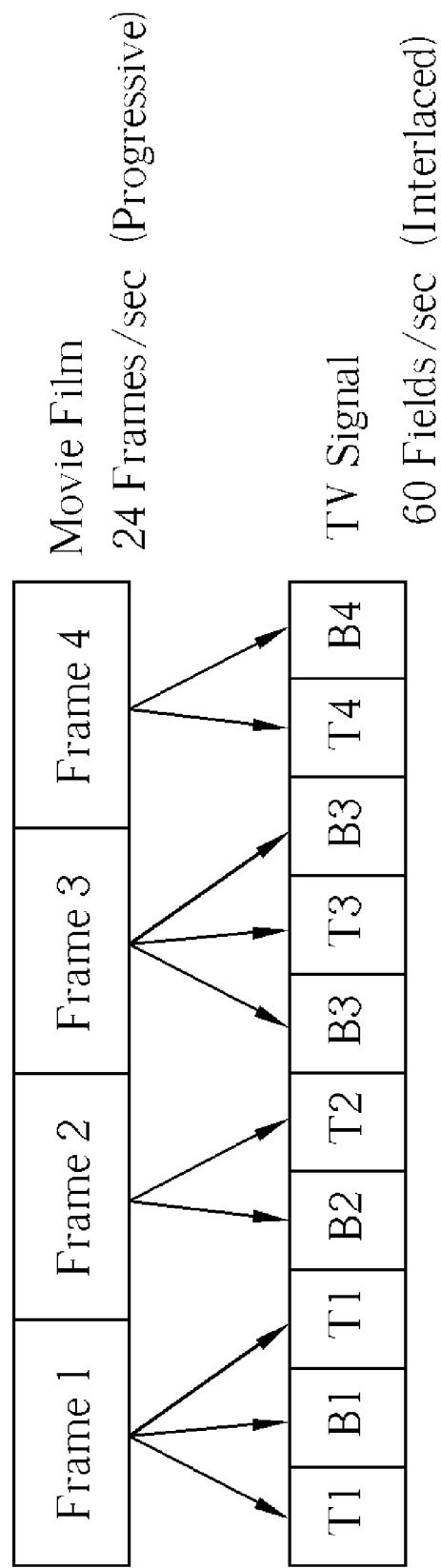
FIG. 1 illustrates a segment of movie film being scanned for broadcast as an NTSC television signal according to a typical 3:2 pull down scanning technique.

The incoming video signal I contains a plurality of interlacing fields, which together form a video signal such as the TV signal of FIG. 1. The first field buffer 212 stores the previous field, and the second field buffer 212 stores the field prior to the previous field. First spatial data corresponding to a current field in the video signal I is received by the first transformation unit 202, and second spatial data corresponding to the field being received two field times earlier is received by the second transformation unit 204. That is, the second field buffer 212 outputs to the second transformation unit 204 the spatial data corresponding the field being prior to the previous field.

Figure 3:
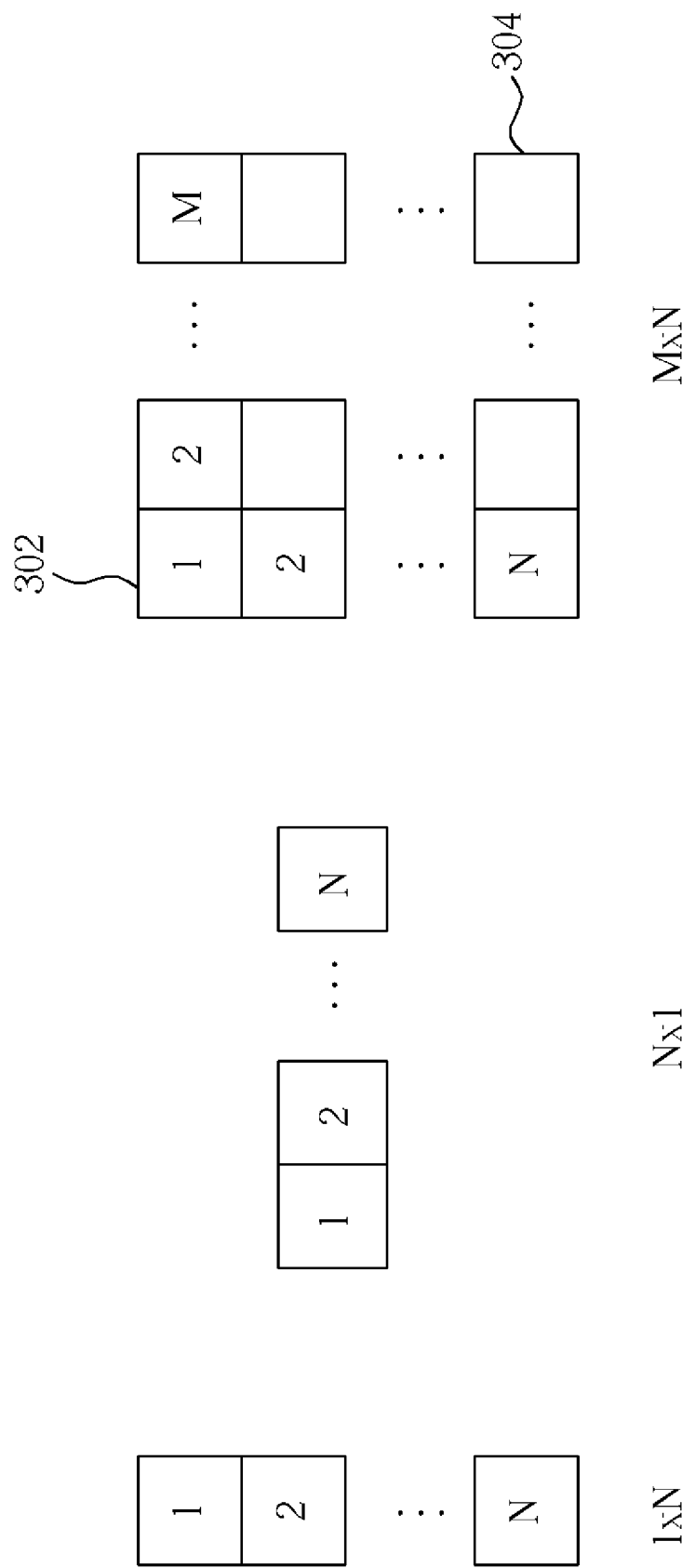
FIG. 3 shows matrix diagrams illustrating the possible transformation functions as performed by the first transformation unit and the second transformation unit of FIG. 2.

FIG. 3 shows matrix diagrams illustrating possible transformation functions as performed by the first transformation unit 202 and the second transformation unit 204 of FIG. 2. The first transformation unit 202 performs a domain transformation on the first spatial data $S_1$ from the current field to thereby generate first frequency data $F_1$. Likewise, the second transformation unit 204 performs a domain transformation on the second spatial data $S_2$ from the current field to thereby generate second frequency data $F_2$. As shown in FIG. 3, the transformation operation performed by the transformation units 202, 204 can be a one dimensional 1×N transform function, a one dimensional N×1 transform function, or two dimensional M×N transform function. For example, in different embodiments, the transform function is a discrete cosine transform (DCT), a discrete Fourier transform (DFT), a discrete integer transform (DIT), or a discrete wavelet transform (DWT). As will be apparent to a person of ordinary skill in the art after reading this description, other transformation functions for generating the first and second frequency data $F_1$, $F_2$ can also be utilized.

Figure 4:
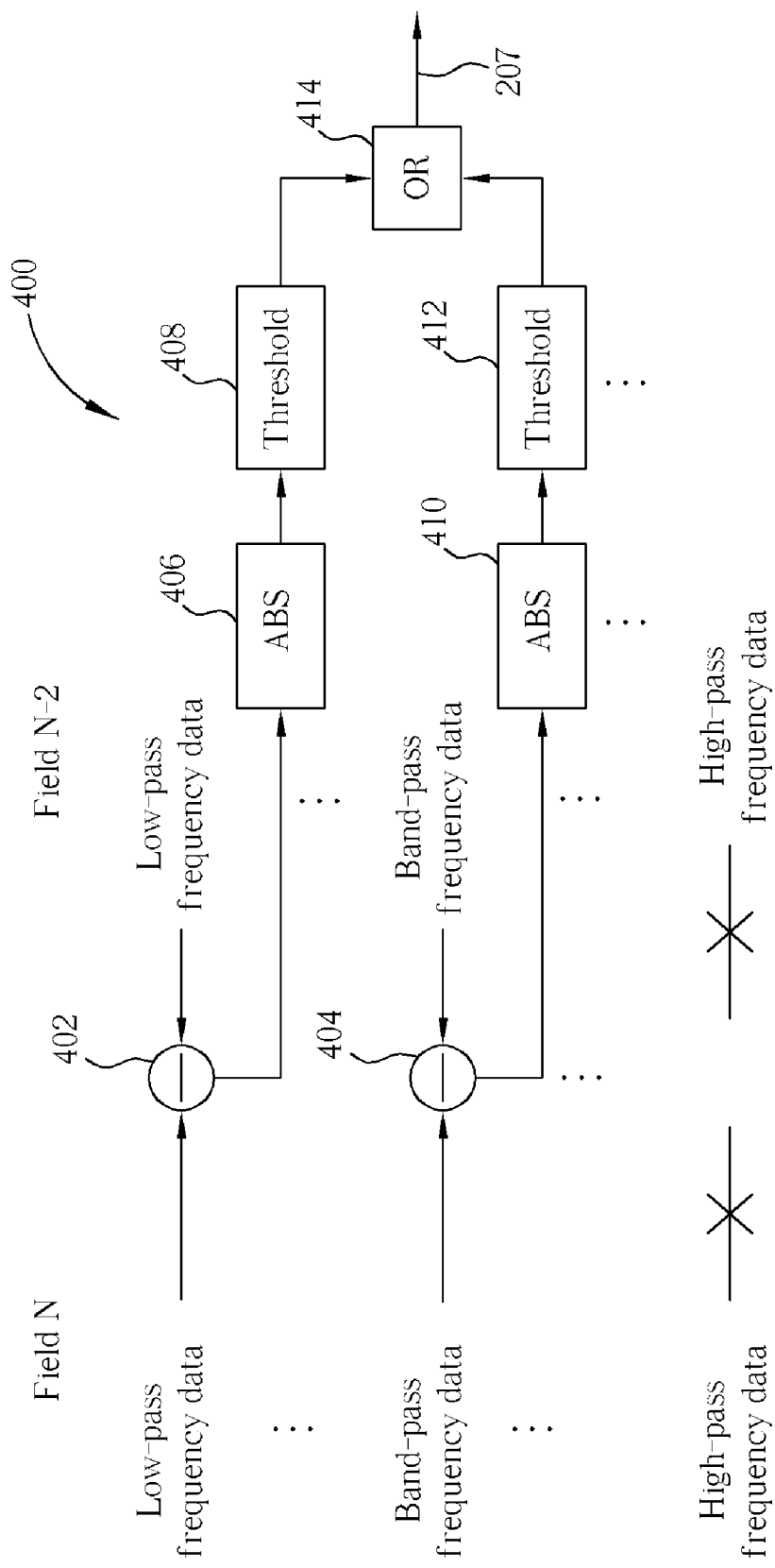
FIG. 4 is a first exemplary embodiment of the transform domain comparator of FIG. 2.

After being generated, the first and second frequency data $F_1$, $F_2$ are transmitted to the transform domain comparator 206. FIG. 4 shows a first exemplary embodiment 400 of the transform domain comparator 206 of FIG. 2. As shown, in this embodiment, the transform domain comparator 400 includes a plurality of band subtractors 402, 404, etc; a plurality of absolute value generators 406, 410, etc; a plurality of comparators 408, 412, etc; and a logic unit 414 being implemented in this embodiment as an OR-gate 414. Each of the subtractors 402, 404, etc subtracts corresponding values between the first and second frequency data $F_1$, $F_2$. Because the frequency data $F_1$, $F_2$ corresponds to the frequency domain, each of the subtractors 402, 404, etc also corresponds to a section of the frequency spectrum. For example, as shown in FIG. 4, the first subtractor 402 finds the difference between low-pass frequency data of the first and second frequency data $F_1$, $F_2$. Similarly, the second subtractor 404 finds the difference between band-pass frequency data of the first and second frequency data $F_1$, $F_2$. To optimize speed, each of the subtraction operations by the first and second subtractors 402, 404 are performed in parallel. In this embodiment, to reduce effects of noise, the high-pass frequency data of the first and second frequency data $F_1$, $F_2$ are not compared. The reason the high-pass frequency data is not utilized in the comparison is because typically there will be high frequency noise present on the incoming video signal I. Therefore, by not comparing the high-pass frequency data after the domain transformation to frequency domain, effects of the high frequency noise are eliminated.

The first absolute value generator 406 determines the absolute value of the difference between the low-pass frequency data of the first and second frequency data $F_1$, $F_2$; likewise, the second absolute value generator 406 determines the absolute value of the difference between the band-pass frequency data of the first and second frequency data $F_1$, $F_2$. The threshold comparators 408 and 412 then check if the absolute values are greater than predetermined thresholds. That is, if the difference between the low-pass frequency data of the first and second frequency data $F_1$, $F_2$ is greater than a first predetermined threshold, the first threshold comparator 408 will assert its output value to the OR-gate 414. Additionally, if the difference between the band-pass frequency data of the first and second frequency data $F_1$, $F_2$ is greater than a second predetermined threshold, the second threshold comparator 412 will assert its output value to the OR-gate 414. In this way, if there is a significant difference between the first and second frequency data $F_1$, $F_2$, the output 207 of the OR-gate 414 will be asserted; otherwise, the output 207 of the OR-gate 414 will not be asserted.

As shown in FIG. 2, the output 207 of the OR-gate 414 is coupled to the accumulator 208. In this embodiment, the accumulator 208 adds the output 207 for all frequency data in the current field (corresponding to frequency data $F_1$) and the frequency data in the field prior to the previous field (corresponding to frequency data $F_2$). That is, the accumulator 208 outputs a field comparison result corresponding to the difference between the current field and the field prior to the previous field. The process is then repeated for a next incoming field, and so on. The detector 210 analyzes the series of field comparison results outputted by the accumulator 208 to determine whether the series of field comparison results has a predetermined pattern indicating the format of the incoming video signal I.

In general, the predetermined pattern indicating that the format of the incoming video signal I is a 3:2 pattern is identified by a field differencing process. Frequency data $F_1$ and $F_2$ for fields having a separation of 2 are compared. A high difference value indicates a change between fields. Where "1" indicates a high difference value above a predetermined threshold, the 3:2 pattern will be 0, 1, 1, 1, 1, 0, 1, 1, 1, 1, 0 . . . when there is motion. Once this pattern is identified, the detector 210 determines the incoming video signal I to be the result of a film-to-video conversion having a 3:2 pull down format. In this way, the fields associated with "0" field difference values are considered repeated fields to optimize later motion compensation or video compression processes that are performed on the incoming video signal I. For inverse Telecine processing, the repeated fields are the guides to synchronize output sequence to original film sequence so that each output frame is generated from two fields originally from the same film frame.

Figure 5:
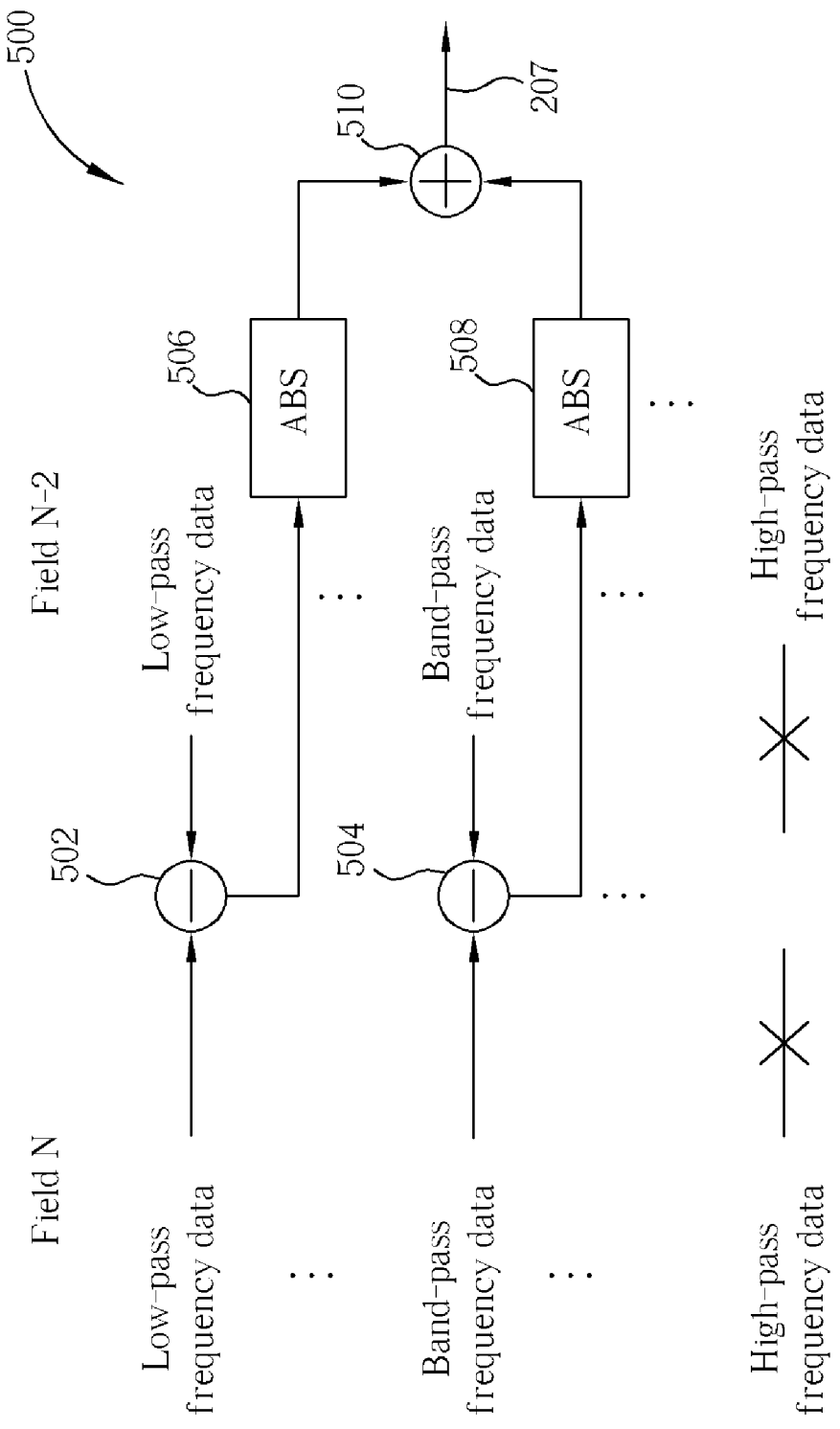
FIG. 5 is a second exemplary embodiment of the transform domain comparator of FIG. 2.

FIG. 5 shows a second exemplary embodiment 500 of the transform domain comparator 206 of FIG. 2. As shown, in this embodiment, the transform domain comparator 500 includes a plurality of band subtractors 502, 504, etc; a plurality of absolute value generators 506, 508, etc; and an adder 510. In this embodiment, the band subtractors 502, 504, etc and the absolute value generators 506, 508, etc operate similar to the band subtractors 402, 404, etc and the absolute value generators 406, 408, etc. However, the resulting values corresponding to the absolute values of frequency differences are directly summed in this embodiment by the adder 510 to form a difference value 207. For example, the difference value 207 could be a floating point number corresponding to the frequency difference.

Referring to FIG. 2, in this embodiment, the accumulator 208 adds the frequency difference 207 for all frequency data in the current field (corresponding to frequency data $F_1$) and the frequency data in the field prior to the previous field (corresponding to frequency data $F_2$). That is, the accumulator 208 outputs a field comparison result corresponding to the difference between the current field and the field prior to the previous field. The process is then repeated for a next incoming field, and so on. The detector 210 analyzes the series of field comparison results outputted by the accumulator 208 to determine whether the series of field comparison results has a predetermined pattern indicating the format of the incoming video signal I. Detection of the predetermined pattern can be performed in a manner similar to the above embodiment and a repeated description is therefore omitted.

Figure 6:
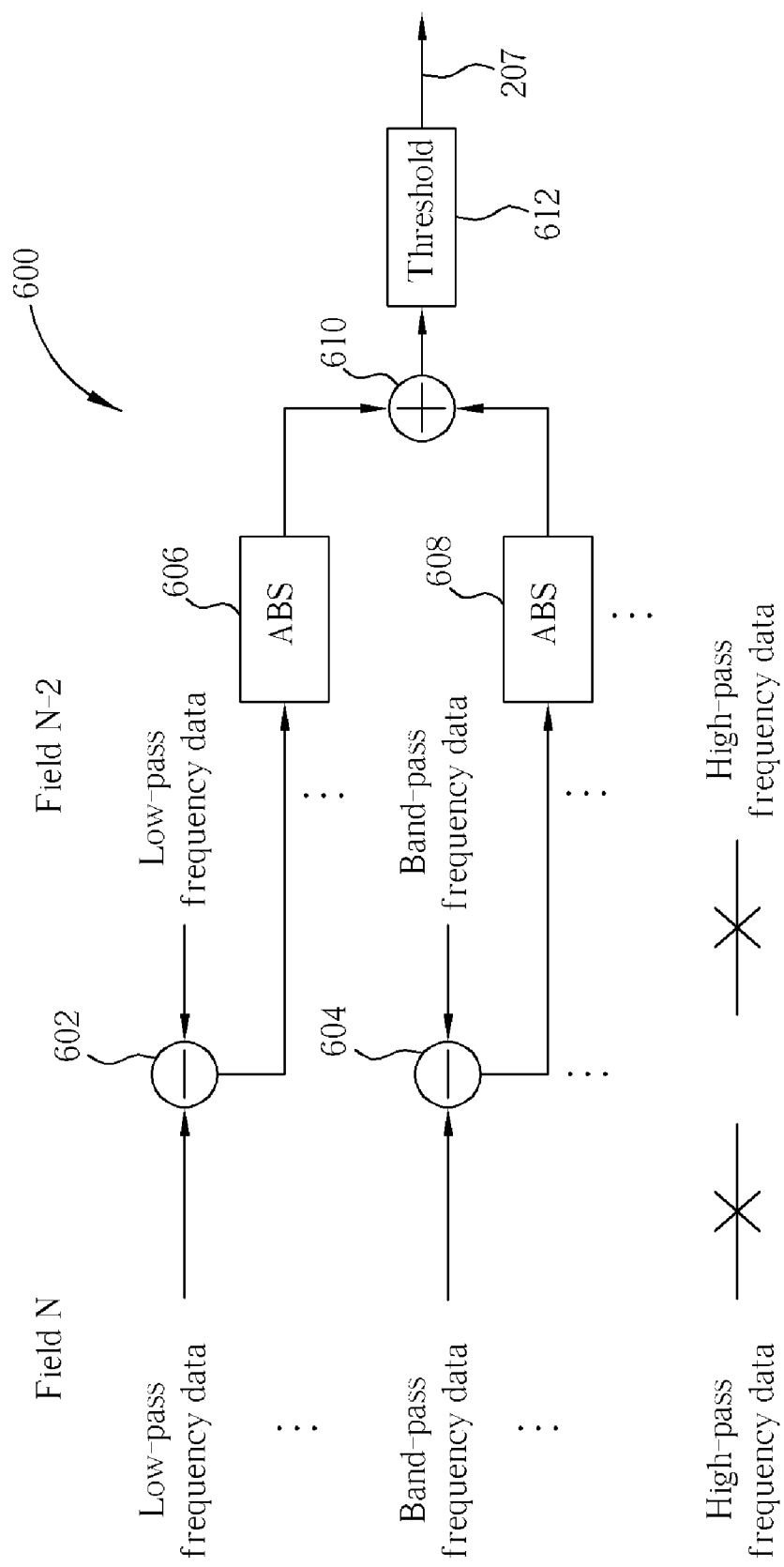
FIG. 6 is a third exemplary embodiment of the transform domain comparator of FIG. 2.

FIG. 6 shows a third exemplary embodiment 600 of the transform domain comparator 206 of FIG. 2. As shown, in this embodiment, the transform domain comparator 600 includes a plurality of band subtractors 602, 604, etc; a plurality of absolute value generators 606, 608, etc; an adder 610; and a comparator 612. In this embodiment, the band subtractors 602, 604, etc and the absolute value generators 606, 608, etc operate similar to the band subtractors 402, 404, etc and the absolute value generators 406, 408, etc. Additionally, the resulting values corresponding to the absolute values of frequency differences are summed by the adder 610 similar to previous embodiment shown in FIG. 5. However, in this embodiment, the output of the adder 610 is coupled to the comparator 612 and is therein compared with a predetermined threshold. For example, the output of the adder 610 could be a floating point number corresponding to the frequency difference, and this floating point number is compared with the predetermined threshold at comparator 612 to see if the floating point number is sufficiently large. If the floating point number is greater than the predetermined threshold, the output 207 of the comparator 612 is asserted to indicate that the first frequency data $F_1$ is different from the second frequency data $F_2$. If the floating point number is not greater than the predetermined threshold, the output 207 of the comparator 612 is not asserted to indicate that the first frequency data $F_1$ is not different from the second frequency data $F_2$.

Referring to FIG. 2, in this embodiment, the accumulator 208 adds the output 207 for all frequency data in the current field (corresponding to frequency data $F_1$) and the frequency data in the field prior to the previous field (corresponding to frequency data $F_2$). That is, the accumulator 208 outputs a field comparison result corresponding to the difference between the current field and the field prior to the previous field. The process is then repeated for a next incoming field, and so on. The detector 210 analyzes the series of field comparison results outputted by the accumulator 208 to determine whether the series of field comparison results has a predetermined pattern indicating the format of the incoming video signal I. Detection of the predetermined pattern can be performed in a manner similar to the above embodiments and a repeated description is therefore omitted.

Figure 7:
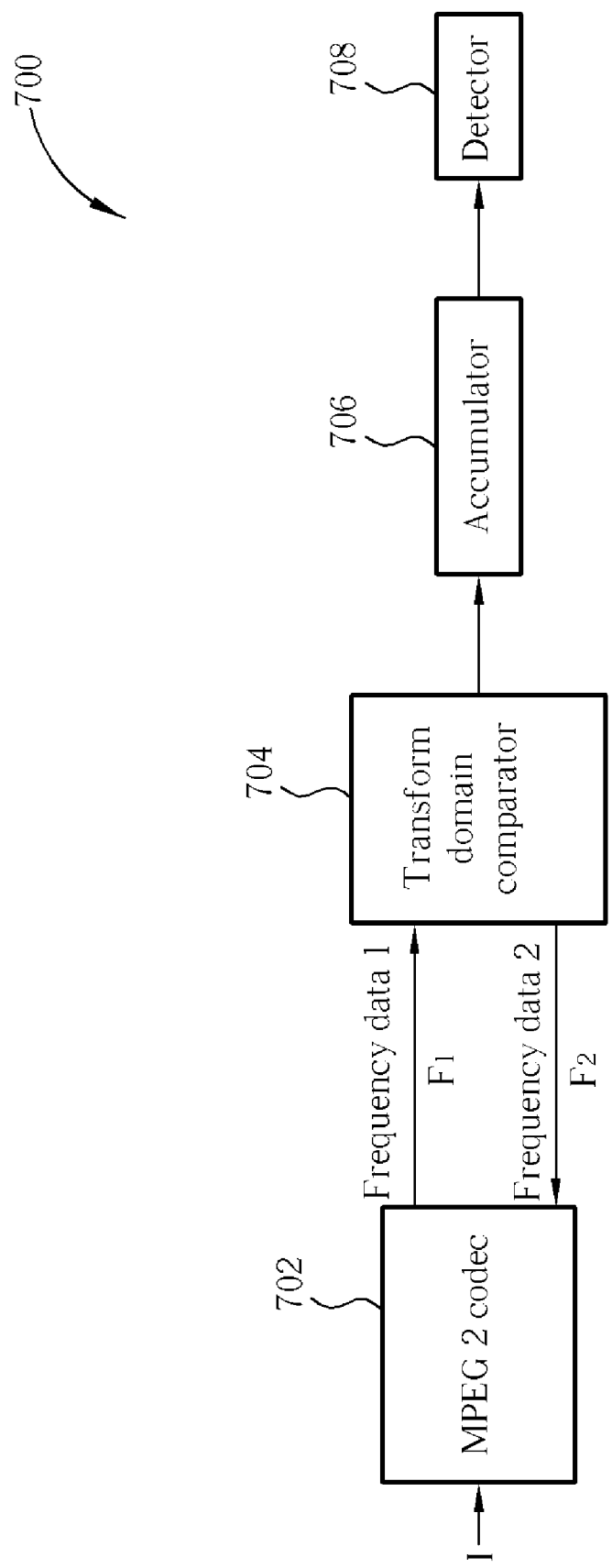
FIG. 7 is a block diagram of a second source format detector for detecting a format type of an incoming video signal I according to a second exemplary embodiment.

FIG. 7 is a block diagram of a second source format detector 700 for detecting a format type of an incoming video signal I according to a second exemplary embodiment. In this embodiment, the source format detector 700 includes an MPEG codec 702, a transform domain comparator 704, an accumulator 706, and a detector 708. As shown in FIG. 7, in this embodiment, the MPEG codec 702 is coupled to the video signal I and generates the first and second frequency data $F_1$, $F_2$. As a part of the MPEG processing, the MPEG codec 702 already generates frequency data information corresponding to frames in the video signal. For this reason, the transform domain comparator 704 in this embodiment is directly coupled to the MPEG codec 702. In this way, generation of the first frequency data $F_1$ and the second frequency data $F_2$ is performed within the MPEG codec, and hardware costs of the source format detector 700 are thereby reduced because separate domain transform units are not required. As will be apparent to a person of ordinary skill in the art after having read the above description, any of the above embodiments can be utilized with respect to the operations of the transform domain comparator 704, the accumulator 706, and the detector 708.

Figure 8:
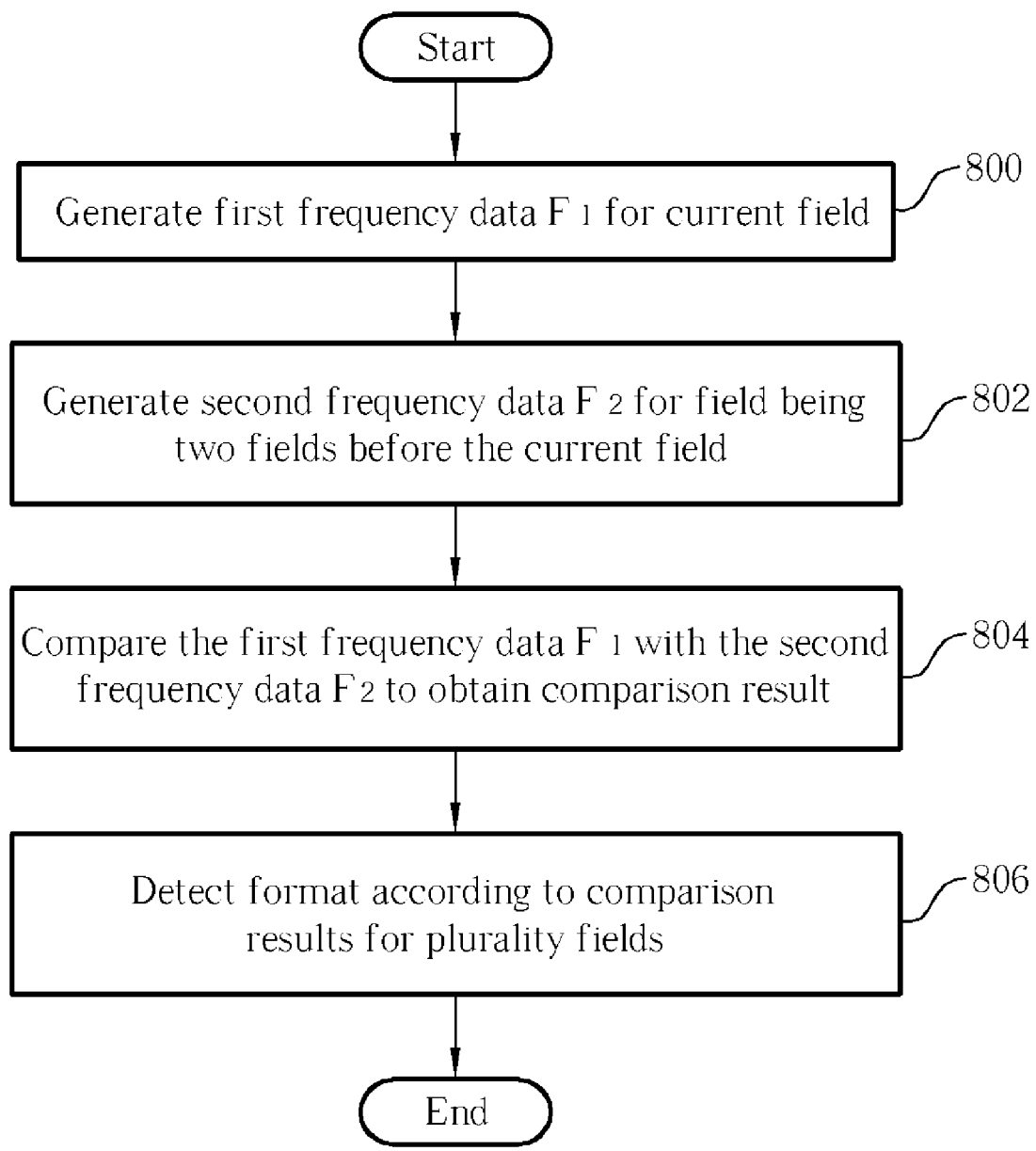
FIG. 8 is a flowchart illustrating a method of detecting a format type of an incoming video signal according to an exemplary embodiment.

FIG. 8 is a flowchart illustrating a general method of detecting a format type of an incoming video signal according to an exemplary embodiment. Provided that substantially the same result is achieved, the steps of the flowchart shown in FIG. 8 need not be in the exact order shown and need not be contiguous, that is, other steps can be intermediate. In this embodiment, detecting a format type of an incoming video signal includes the following steps:

Step 800: Generate first frequency data $F_1$ corresponding to a first field in the video signal I. For example, the first field in the video signal I is a current field in the video signal I and the first frequency data $F_1$ is generated according to spatial data $S_1$ for the first field or as a part of the MPEG codec processing of the video signal I.

Step 802: Generate second frequency data $F_2$ corresponding to a second field in the video signal I. For example, the second field in the video signal I is a field being prior to a previous field in the video signal I. Therefore, the second field is two fields before the first field in the video signal I. The second frequency data $F_2$ is generated according to spatial data $S_2$ for the second field or as a part of the MPEG codec processing of the video signal I.

Step 804: Compare the first frequency data $F_1$ with the second frequency data $F_2$ to obtain a comparison result.

Step 806: Detect the format of the video signal according to comparison results for a plurality of first and second fields. That is, to identify the format of the video signal I, comparison results are generated for a plurality of first and second fields being fields separated by one field in the series of continuous fields received in the video signal I.

At step 806, the format of the video signal is determined according to the comparison results. Assuming a comparison result having a value of "1" indicates a significant difference between the frequency data of the first and second fields as compared at step 804, the 3:2 pattern will be 0, 1, 1, 1, 1, 0, 1, 1, 1, 1, 0 . . . when there is motion. At step 806, once this pattern is identified, the video signal I can be determined to be the result of a film-to-video conversion having a 3:2 pull down format. In this way, the fields associated with "0" field difference values are considered repeated fields when performing later motion compensation, optimization, or video compression processes on the incoming video signal I. For inverse Telecine processing, the repeated fields are the guides to synchronize output sequence to original film sequence so that each output frame is generated from two fields originally from the same film frame.

An advantage of the above method of detecting a format type of an incoming video signal is that greatly improved picture quality of MPEG encoded data can be derived from film. Because the data is 24 frames per second, rather than 30 frames per second, the repeated fields associated with "0" in the 3:2 pull down format can be dropped, and more bits can thereby be used per frame in the MPEG digitization process. Also, the method eliminates wasted bits due to high frequencies in frames with time-separated fields.

Another advantage of the above method of detecting a format type of an incoming video signal is that appropriate interpolation method for inverse Telecine processing can be used. Interpolation can be performed between two fields from original film frames to eliminate artifacts of interpolating across different frames. Also, quality of progressive video output can be improved.

It should also be noted that although only low-pass frequency data and band-pass frequency data are compared in the above embodiments, this is for example only and is not meant as a limitation. In fact, any number of subtractors can be utilized in different embodiments. Additionally, as will be apparent to those skilled in the art, it is also possible to compare different amounts of the high-pass frequency data and redefine different cutoff frequencies for where the high-pass frequency data will be defined to start. Moreover, in another embodiment, the amount of high frequency data compared could also be controlled via the domain transform function. For example, as shown in FIG. 3, the M×N transform function includes a plurality of coefficients. In the M×N transform, coefficient 302 corresponds to a lowest frequency value, and coefficient 304 corresponds to a highest frequency value. Other coefficients near to coefficient 302 generally correspond to low frequency values, and other coefficients near to coefficient 304 generally correspond to high frequency values. By adjusting the coefficients of the M×N transform function, high-pass frequency data can be eliminated.

The above embodiments provide a method and source detector for detecting a format of a video signal. By generating first frequency data corresponding to a first field in the video signal, generating second frequency data corresponding to a second field in the video signal, comparing the first frequency data with the second frequency data to obtain a comparison result, and detecting the format of the video signal according to comparison results for a plurality of first and second fields, the original source format of the video signal can be determined. Optimized video compression or video processing can then be performed according to the detected format.

What is claimed is:

1. A method of detecting a format of a video signal, the method comprising:
    generating first frequency data corresponding to a first field in the video signal;
    generating second frequency data corresponding to a second field in the video signal;
    comparing the first frequency data with the second frequency data to obtain a comparison result; and
    detecting the format of the video signal according to comparison results for a plurality of first and second fields.

2. The method of claim 1, wherein the second field is two fields before the first field in the video signal.

3. The method of claim 1, wherein the plurality of first and second fields comprise fields being separated by one field in a series of continuous fields, and wherein detecting the format of the video signal further comprises obtaining a series of comparison results by comparing the first frequency data with the second frequency data for each of the plurality of first and second fields for the series of continuous fields.

4. The method of claim 3, wherein detecting the format of the video signal further comprises analyzing the series of field comparison results to determine whether the series of field comparison results has a predetermined pattern.

5. The method of claim 4, wherein the predetermined pattern corresponds to a film-to-video conversion.

6. The method of claim 5, wherein the film-to-video conversion is a 3:2 pull down format.

7. The method of claim 1, wherein generating the first frequency data and generating the second frequency data further comprises respectfully transforming spatial pixel data of the first field and transforming spatial pixel data of the second field according to a predetermined transformation function.

8. The method of claim 7, wherein the predetermined transformation function is a discrete cosine transform (DCT), a discrete Fourier transform (DFT), a discrete integer transform (DIT), or a discrete wavelet transform (DWT).

9. The method of claim 1, wherein generating the first frequency data and generating the second frequency data further comprises providing a moving pictures experts group (MPEG) encoder or decoder (CODEC) for generating the first frequency data and the second frequency data according to the video signal being processed by the MPEG encoder or a video bit stream being processed by the MPEG decoder.

10. The method of claim 1, wherein comparing the first frequency data with the second frequency data to obtain the comparison result further comprises comparing a plurality of frequency bands of the first frequency data with a corresponding plurality of frequency bands of the second frequency data.

11. The method of claim 10, wherein comparing the first frequency data with the second frequency data further comprises comparing only frequency components being below a high frequency threshold; wherein high frequency components of the first frequency data and the second frequency data being above the high frequency threshold are not compared.

12. The method of claim 10, wherein comparing the first frequency data with the second frequency data further comprises:
    calculating a difference value between the first frequency data and the second frequency data for each frequency band;
    calculating an absolute value of the difference value for each frequency band;
    comparing the absolute values for each band with a predetermined band threshold to generate a band output value for each frequency band; and performing a logic operation on the band output values for the plurality of frequency bands to thereby generate the comparison result.

13. The method of claim 12, wherein the logic operation is an OR function.

14. The method of claim 10, wherein comparing the first frequency data with the second frequency data further comprises:
- calculating a difference value between the first frequency data and the second frequency data for each frequency band;
- calculating an absolute value of the difference value for each frequency band; and
- summing the absolute value for each frequency band to thereby generate the comparison result.

15. The method of claim 10, wherein comparing the first frequency data with the second frequency data further comprises:
- calculating a difference value between the first frequency data and the second frequency data for each frequency band;
- calculating an absolute value of the difference value for each frequency band;
- summing the absolute value for each frequency band to thereby generate a field difference value; and
- comparing the field difference value with a predetermined field difference threshold to thereby generate the comparison result.

16. A source format detector for detecting a format of a video signal, the source format detector comprising:
- a frequency data generator for generating first frequency data corresponding to a first field in the video signal, and second frequency data corresponding to a second field in the video signal;
- a transform domain comparator for comparing the first frequency data with the second frequency data to thereby obtain a comparison result; and
- a detector for detecting the format of the video signal according to comparison results for a plurality of first and second fields.

17. The source format detector of claim 16, wherein the second field is two fields before the first field in the video signal.

18. The source format detector of claim 16, wherein the plurality of first and second fields comprises fields being separated by one field in a series of continuous fields, and the transform domain comparator is further for obtaining a series of comparison results by comparing the first frequency data with the second frequency data for each of the plurality of first and second fields for the series of continuous fields.

19. The source format detector of claim 18, wherein the detector is further for detecting the format of the video signal by analyzing the series of field comparison results to determine whether the series of field comparison results has a predetermined pattern.

20. The source format detector of claim 19, wherein the predetermined pattern corresponds to a film-to-video conversion.

21. The source format detector of claim 20, wherein the film-to-video conversion is a 3:2 pull down format.

22. The source format detector of claim 16, wherein the frequency data generator comprises:
- a first transformation unit for transforming spatial pixel data of the first field according to a predetermined transformation function to thereby generate the first frequency data; and
- a second transformation unit for transforming spatial pixel data of the second field according to the predetermined transformation function to thereby generate the second frequency data.

23. The source format detector of claim 22, wherein the predetermined transformation function is a discrete cosine transform (DCT), a discrete Fourier transform (DFT), a discrete integer transform (DIT), or a discrete wavelet transform (DWT).

24. The source format detector of claim 16, wherein the frequency data generator comprises a moving pictures experts group (MPEG) encoder or decoder (CODEC) for generating the first frequency data and the second frequency data according to the video signal being processed by the MPEG encoder or a video bit stream being processed by the MPEG decoder.

25. The source format detector of claim 16, wherein the transform domain comparator further comprises a plurality of subtractors for comparing bits corresponding to a plurality of frequency bands of the first frequency data with bits corresponding to the plurality of frequency bands of the second frequency data.

26. The source format detector of claim 25, wherein the transform domain comparator comprises subtractors only for comparing bits corresponding to frequency components of the first frequency data and the second frequency data being below a high frequency threshold; wherein bits corresponding to high frequency components of the first frequency data and the second frequency data being above the high frequency threshold are not compared.

27. The source format detector of claim 25, wherein the transform domain comparator comprises:
- a band subtractor being coupled to the first frequency data and the second frequency data for calculating a difference value between bits of the first frequency data and bits of the second frequency data for each frequency band;
- an absolute value generator for calculating an absolute value of the difference value for each frequency band;
- a comparator for comparing the absolute values for each band with a predetermined band threshold to generate a band output value for each frequency band; and
- a logic unit for performing a logic operation on the band output values for the plurality of frequency bands to thereby generate the comparison result.

28. The source format detector of claim 27, wherein the logic unit is a multi-input OR-gate.

29. The source format detector of claim 25, wherein the transform domain comparator comprises:
- a band subtractor being coupled to the first frequency data and the second frequency data for calculating a difference value between bits of the first frequency data and bits of the second frequency data for each frequency band;
- an absolute value generator for calculating an absolute value of the difference value for each frequency band; and
- an adder for summing the absolute value for each frequency band to thereby generate the comparison result.

30. The source format detector of claim 25, wherein the transform domain comparator comprises:
- a band subtractor being coupled to the first frequency data and the second frequency data for calculating a difference value between bits of the first frequency data and bits of the second frequency data for each frequency band;

an absolute value generator for calculating an absolute value of the difference value for each frequency band;

an adder for summing the absolute value for each frequency band to thereby generate a field difference value; and a comparator for comparing the field difference value with a predetermined field difference threshold to thereby generate the comparison result.

* * * * *